United States Patent

[11] 3,560,752

[72] Inventors Yee Lee
Lexington;
Robert W. Rauth, Port Huron, Mich.
[21] Appl No 755,473
[22] Filed Apr. 15, 1968
Division of Ser. No. 541,340, Apr. 8, 1966, Patent No. 3,412,877.
[45] Patented Feb. 2, 1971
[73] Assignee The Bin-Dicator Company
Detroit, Mich.
a corporation of Michigan. by mesne assignment

[54] ELECTRICAL-OPTICAL MOTION DETECTOR
10 Claims, 5 Drawing Figs.
[52] U.S. Cl. .................................................. 250/214,
73/518, 250/231, 250/233, 340/223, 340/263
[51] Int. Cl. ............................................... H01j 39/12
[50] Field of Search .......................................... 250/209,
214, 231, 233; 340/223, 263; 73/488, 518

[56] References Cited
UNITED STATES PATENTS
2,804,131 8/1957 Ator ............................. 250/233X
3,454,777 7/1969 Marcus ......................... 250/231SE
FOREIGN PATENTS
598,590 2/1948 Great Britain ................ 340/223

Primary Examiner—James W. Lawrence
Assistant Examiner—C. M. Leedom
Attorney—Barnes, Kisselle, Raisch and Choate ABSTRACT: Motion detection apparatus wherein the rotation of a motor shaft in a material level control causes sequential energization of a pair of photocell switches via a suitable light mask carried on the shaft and at a rate related to the velocity of the shaft. A first capacitor is connected to a power supply through one of the photocell switches and a second capacitor is connected to the first capacitor by the other photocell switch. The photocell switches progressively transfer electrical energy from a power supply to the first capacitor and then to the second capacitor which serves as the input for a silicon controlled rectifier controlling energization of the motor. When the motor shaft stops rotating or deviates from a predetermined rotational velocity, the progressive energy transfer ceases to thereby stop the motor.

PATENTED FEB 2 1971 3,560,752

INVENTORS
YEE LEE &
ROBERT W. RAUTH
BY
Barnes, Kisselle, Raisch & Choate
ATTORNEYS

YEE LEE & ROBERT W. RAUTH *INVENTORS*

BY
*Barnes, Kisselle, Raisch & Choate*
ATTORNEYS

ELECTRICAL-OPTICAL MOTION DETECTOR

This application is a division of our copending application Ser. No. 541,340, filed Apr. 8, 1966, U.S. Pat. No. 3,412,877, and entitled "Electrical-Optical Motion Detector."

This invention relates generally to an electrical-optical apparatus for sn sensing a change in the velocity of a moving object and more particularly to a material level control apparatus wherein a predetermined level of material in a container or the like is sensed by such electrical-optical apparatus in response to a variation in the rotational speed of a paddle when the material reaches the predetermined level in the container and stops rotation of the paddle. Although the electrical-optical apparatus of the present invention is disclosed in conjunction with the material level control for which it was conceived, it will be understood that the present invention is useful in other applications to sense variations in the motion of objects generally and more particularly to sense changes in the rotational velocity of a rotating shaft.

One object of the present invention is to provide an apparatus which effectively senses a change in the velocity of a moving object and which is particularly effective to sense the stopped condition of a motor-driven shaft in a material level control.

Further objects of the present invention are to provide a motion detector apparatus of the aforementioned type that is constructed simply and economically; that is reliable and not subject to mechanical failure; that is noncontacting; that does not present a load on a moving object, such as a rotating shaft, and therefore can provide increased sensitivity relative to prior devices which load the shaft; that senses the motion of the object directly rather than indirectly and thus provides a true indication of shaft motion; and that is versatile in that a "fail-safe" operation can be obtained with minor modifications for either a container full of material prevent overflow of the material or for an empty container to assure that material is always present in the container.

Other objects, features and advantages of the present invention will become apparent in connection with the following description, the appended claims, and the accompanying drawings in which:

Figure 1:
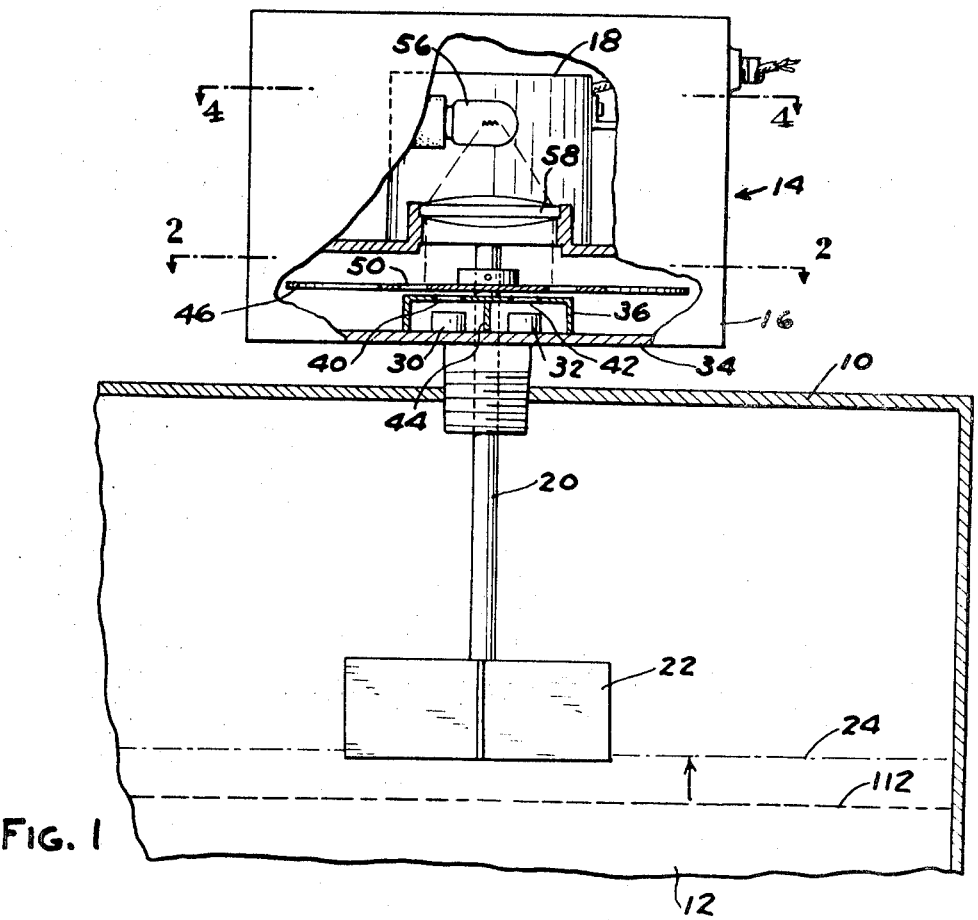
FIG. 1 is a view, partly broken away and partly in section, of the mechanical apparatus of the section detector of the present invention applied to a rotating paddle type level control for dry bulk materials.

For purposes of illustration and not by way of limitation, a bin 10 is illustrated in FIG. 1 partially filled with dry bulk material 12. Mounted on the top of bin 10 is a level indicating and control device 14 generally comprising a housing 16 on which a motor 18 is mounted. Motor 18 has a drive shaft 20 which extends downwardly and rotatably through housing 16 to project into the bin 10. A 4-bladed paddle 22 fixedly mounted on the lower end of shaft 20 is disposed in the bin 10 so that when the bin is filled with the material 12 to a predetermined high level 24, the paddle is frictionally engaged by the material to stop rotation of the paddle 22 and shaft 20. Motor 18 is a synchronous motor which operates at a relatively slow speed and which can be stalled and will remain stalled without damage to the motor until the shaft 20 and paddle 22 are again free to rotate when the level of the material in bin 10 falls below the high level 24. A noncontacting electrical-optical apparatus constructed in accordance with the present invention senses the stopped condition of the shaft 20 when the material 12 reaches the high level 24 and provides a suitable indication of that condition and/or operates suitable material transfer apparatus such as a conveyor 26 (FIG. 5) to terminate filling of the bin and thus prevent overflow.

The electrical-optical apparatus generally comprises a pair of photosensitive resistors 30, 32 referred to hereinafter as photocells 30, 32 which are mounted side-by-side on the bottom wall 34 of housing 16 radially outwardly of the shaft 20. In actual practice, the photocells have leads out of their bottom and they are mounted on an insulating board out of direct contact with the bottom wall 34 of housing 16. The photocells 30, 32 are spaced apart in a direction generally circumferentially of the housing 16 and are enclosed in a light shielding housing 36 which is lighttight except for a pair of apertures 40, 42 in the top of the housing 16. Each aperture 40, 42 is vertically aligned with a receptive one of the photocells 30, 32. Housing 36 also includes a lighttight dividing wall 44 which separates the two photocells 30, 32 so that the effective field of view for each photocell is limited to light entering the housing 36 through one respective aperture 40, 42. An opaque disc 46 is nonrotatably mounted on the shaft 20 for corotation therewith. Disc 46 is constructed with a suitable radius and is arranged vertically on sa shaft 20 so that the disc overlies the two apertures 40, 42. Disc 46 is also formed with nine apertures 50 with which are equally spaced circumferentially about the periphery of the disc and disposed radially of shaft 20 to be vertically aligned with apertures 40, 42 and the respective photocells 30, 32 as the apertures 50 move across the housing 36 when the disc 46 rotates.

Figure 2:
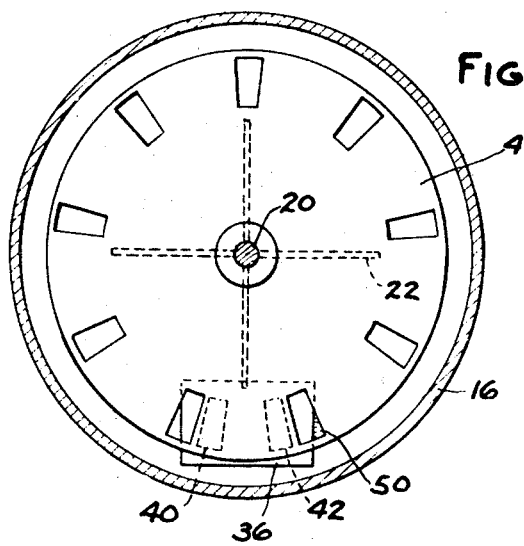
FIG. 2 is a horizontal view taken on line 2-2 of FIG. 1 to illustrate a disc which rotates with the paddle and serves as a light mask to alternatively and sequentially energize two photocells in the control of the present invention.
Figure 3:
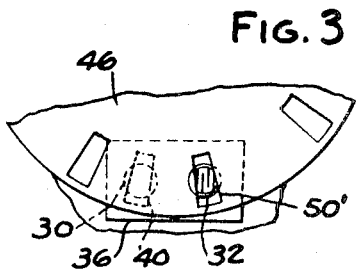
FIG. 3 is a fragmentary horizontal view of the disc rotated slightly from the position illustrated in FIG. 2 so that an aperture in the disc is aligned with one of the photocells.

A light bulb 56 is mounted on housing 16 above disc 46 to serve as a source of light which is focused by a lens system 58 into a parallel ray light beam which is wide enough to irradiate both photocells 30, 32 as illustrated in broken lines in FIG. 1. However, by interposing disc 46 between the photocells 30, 32 and the light bulb 56, the disc serves as a light mask to interrupt the light so that the photocells 30, 32 are energized in an alternating sequence. As shown in FIGS. 2 and 3, the circumferential spacing between adjacent apertures 50 in the disc 46 is greater than the lateral spacing between the photocells 30, 32 and the corresponding apertures 40, 42 so that, assuming counterclockwise rotation of disc 46 as viewed in FIGS. 2 and 3, photocell 30 will be irradiated by light passing through one of the apertures 50 and then as the disc rotates further, photocell 32 will be irradiated by light passing through the same aperture. Additionally, the spacing between adjacent apertures 50 is such that both photocells 30, 32 will not be irradiated simultaneously. In general, operation of the control circuit (FIG. 5) to be described depends on sequential and alternate energization of at least two photocells and arrangement of the optical system including apertures 40, 42, apertures 50, and the light source 56, so that at any given time one of the photocells 30, 32, is completely shielded from the light either when disc 46 is rotating or when it is stopped.

Figure 5:
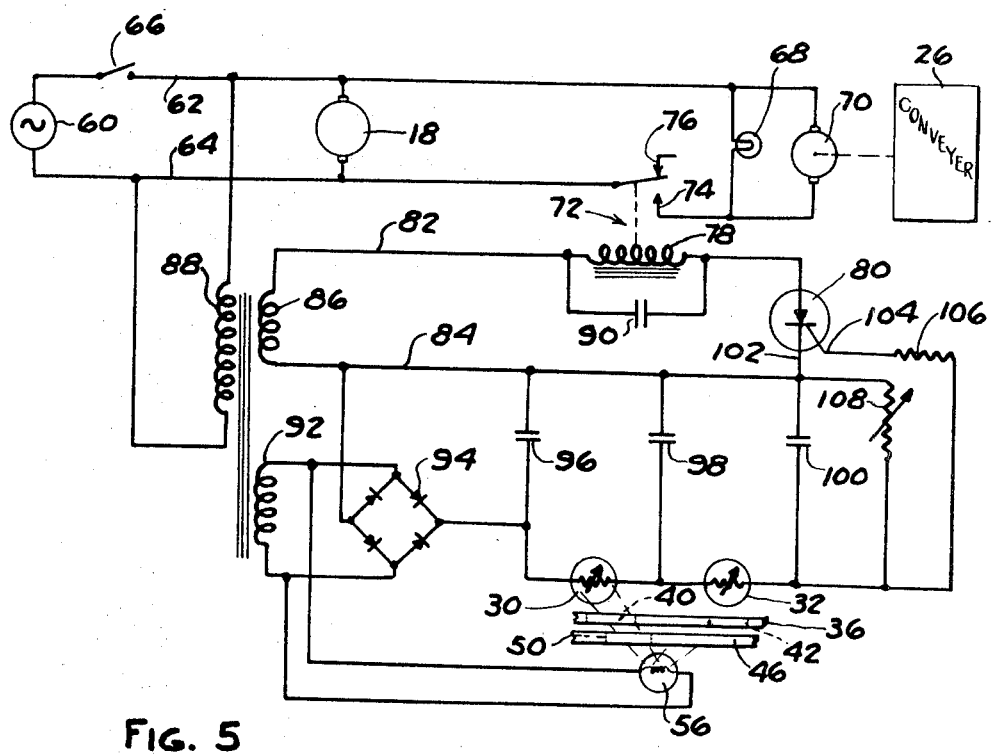
FIG. 5 is a circuit diagram of the control of the present invention.

The control circuit illustrated in FIG. 5 generally comprises an alternating current source 60 which is connected to a pair of main bus conductors 62, 64 through an on-off switch 66. Motor 18 is connected directly across conductors 62, 64. An indicator lamp 68 and a motor 70 which drives conveyor 26 are also arranged to be connected across conductors 62, 64 by a relay 72. Relay 72 includes a normally open contact 74, a normally closed contact 76 and a relay coil 78. Coil 78 is connected in series with a silicon-controlled rectifier 80 and through conductors 82, 84 across a secondary transformer winding 86 which is fed by a primary winding 88 connected across the bus conductors 62, 64. The usual relay holding capacitor 90 is connected across coil 78.

Figure 4:
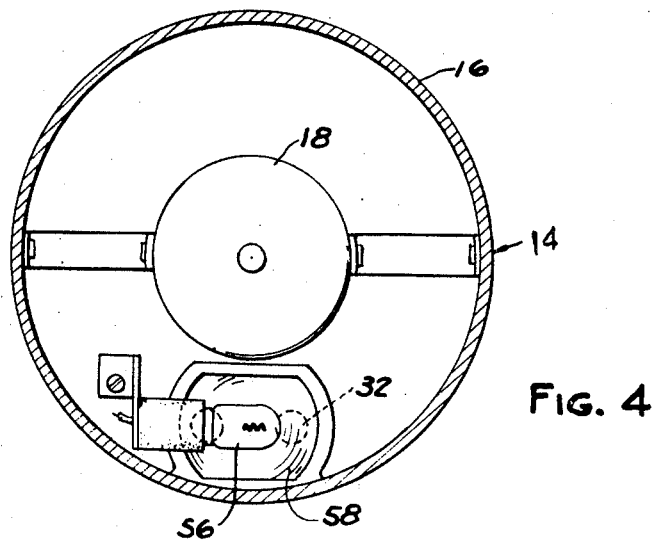
FIG. 4 is a horizontal view taken on line 4-4 of FIG. 1.

The primary winding 88 also feeds a secondary winding 92 whose output is rectified by a full-wave bridge rectifier 94 to develop a direct current output across a filter capacitor 96. The bulb 56 (FIGS. 1, 4 and 5) is also connected across the secondary winding 92. The direct current output from rectifier 94 is applied to photocell 30 which is connected in series with a storage capacitor 98 across the filter capacitor 96. Photocell 32 is in turn connected in series with a second storage capacitor 100 across the capacitor 98. The voltage across capacitor 100 is in turn applied between the cathode 102 and the electrode 104 of rectifier 80 through a resistor 106. A shunt resistor 108 connected across capacitor 100 controls the charge and discharge time of the capacitor. Resistor 108 is illustrated as an adjustable resistor although it is to be understood that for a given application the value for resistor 108 will be chosen for that application and resistor 108 will be a fixed resistor.

The operation of the apparatus of the present invention is best understood assuming that the material 12 in bin 10 is at a level 112 (FIG. 1) below paddle 22. When the switch 66 is closed, motor 18 is energized and the paddle 22 begins to rotate in a counterclockwise direction as viewed in FIG. 2. Bulb 56 is on so that the light can pass through one of the apertures 50 in the disc 46 and then through the aperture 40 to energize photocell 30. When photocell 30 is energized, capacitor 98 is connected across the output of rectifier 94 and will be charged during the time that photocell 30 is energized. As the disc continues to rotate in a counterclockwise direction as viewed in FIGS. 2 and 3, the aperture 50 moves beyond photocell 30 and then into alignment with aperture 42 and photocell 32 as illustrated by the aperture 50' in FIG. 3. It is to be noted that the aperture 50' moves out of alignment with the aperture 40 and the photocell 30 to cut off the light to photocell 30 before the aperture 50' registers with aperture 42 and the photocell 32. Thus, the when light to the photocell 30 is blocked, capacitor 98 in disconnected from rectifier 94 and the when light from source 56 strikes photocell 32 through the aperture 50', capacitor 100 is connected across the capacitor 98 and is charged by the capacitor 98. The voltage across capacitor 100 gates rectifier 80 on to connect coil 78 across winding 86 and energize relay 72 which in turn closes contact 74.

The closure of contact 74 energizes bulb 68 and motor 70. Bulb 68 provides an indication that paddle 22 is rotating and thus that the level of he material 12 is below the high level 24. Motor 70 drives the conveyor 26 which transfers more bulk material 12 into the bin 10. As the disc 46 continues to rotate in a counterclockwise direction, the aperture 50' moves past the photocell 32 so that the photocell 32 is covered by the disc 46 before the next adjacent aperture 50 registers with aperture 40 said photocell 30. Thus, so long as the disc 46 is rotating, photocells 30, 32 will be alternately energized to sequentially charge capacitor 98, disconnect capacitor 98 from rectifier 94, connect capacitor 100 across capacitor 98 and then disconnect capacitor 98 before capacitor 98 is again connected to rectifier 94. Capacitor 100 will remain charged as along as the disc 46 is rotating and will maintain the rectifier 80 forward biased and relay 72 energized. Stated differently, the sequential and alternate energization of photocells 30, 32 progressively transfers the energy from rectifier 94 to capacitor 100 but at no time is capacitor 100 connected directly to the rectifier 94 because the photocells 40, 32 are never energized simultaneously . The shunt resistor 108 bleeds the capacitor 100 and thus tends to decrease the gate voltage of rectifier 80 but the repeated pulsing of capacitor 100 maintains the forward bias on rectifier 80 as long as the disc 46 is rotating.

When the bulk material 12 reaches the high level 24 in the bin 10, the material engages the paddle 22 and the very slight additional load on the paddle 22 stalls the motor 18 so that shaft 20 and disc 46 stop rotating. When motor 18 stalls and disc 46 stops rotating, at least one, and possibly both, of the photocells 30, 32 will be dark, that is, shielded from the light bulb 56 by the disc 46. For example, if photocell 40 is dark and photocell 32 is illuminated, rectifier 80 will continue to conduct until capacitors 98, 100 are discharged by resistor 108. On the other hand, if photocell 32 is dark and photocell 30 is either dark or illuminated, rectifier 80 will remain on until capacitor 200 is discharged by resistor 108. When the voltage on capacitor 100 drops below the forward gate voltage for rectifier 80, rectifier 80 stops conducting to deenergize relay 72 which in turn disconnects bulb 68 and motor 70 from source 60. When motor 70 is turned off, the operation of conveyor 26 is interrupted so that no more material 12 is transferred into the bin 10. As material 12 is withdrawn from the bin 10 by suitable means (not shown), the level of the material 12 will drop below the high level 24 to remove the load on paddle 22 and motor 18 so that the shaft 20 and thus the disc 46 begin to rotate again. Rotation of the disc 46 permits the photocells 30, 32 to be alternately and sequentially energized to charge capacitor 100 and again turn rectifier 80 on and thus energize relay 72, bulb 68 and motor 70.

The electrical-optical apparatus described hereinabove to distinguish the stopped condition of shaft 20 from the rotating condition of the shaft is particularly useful with the material level control since the condition of the shaft 20 is reflected directly and not merely by a failure within the motor power supply, the motor, or any gear trains or clutches that might be used in certain applications. Additionally, no extra torque is required to operate the rotation detector as in certain prior art material level controls. Motor 18 is designed to provide just enough torque to overcome the friction of the bearings and seals and provide the no-load torque required to rotate paddle 22. Thus, the apparatus 14 in its preferred form is designed so that motor 18 will be stalled by even the lightest materials or only very slight contact of the material 12 with the paddle 22 to provide a very sensitive control. For purposes of illustration, one device of the present invention was constructed with a 5 watt (110 volt, 60 cycle) synchronous motor which operated at 5 r.p.m. In the level control described herein the relay 72 is energized when the shaft 20 is rotating and if for any reason, a mechanical or electrical failure should occur, the shaft 20 stops operating and the relay deenergizes. This arrangement provides a high level "fail-safe" control because a failure would give a "full" signal and thus prevent overflow of bin 10. As in conventional material level controls, a second complete level indicator may be employed to sense when the material drops below a prescribed low or empty level. The paddle of the second level indicator is disposed at the empty level and the filling and/or discharge of the bin is controlled by both the high and low level paddle controls. With the present invention, the level control associated with the low level paddle can easily be arranged to provide an empty "fail-safe" indication. By way of further illustration, the rectifier or bias circuit for the rectifier corresponding to rectifier 80 (FIG. 5) can be chosen for the low level control so that the relay is deenergized when the paddle is rotating and energized when the motor stalls and the paddle stops. Thus, in the event of a power failure in the low level paddle supply, the relay would deenergize, as if the material were below the empty level, and commence filling the bin.

Although the electrical-optical apparatus has been described hereinabove for distinguishing between the stopped condition and the rotating condition of a shaft such as the shaft 20, it will be apparent that photocells 30, 32 and the associated electrical circuit can also be used to sense motion other than rotational motion by modifying the light mask corresponding to the rotating disc 42. Thus, the present invention also contemplates a control to sense a velocity change of an object whose motion is rectilinear by providing a suitable mask which moves in response to motion of the object to energize two or more photocells in the manner described hereinabove. Additionally, though the electrical-optical rotation sensing apparatus has been disclosed hereinabove as incorporating photocells, other switching means can be used to alternatively and sequentially charge capacitors 98, 100 in response to the motion of the object. When photocells are used, it is desirable that the cell resistance when it is not irradiated by light is large relative to the cell resistance when it is irradiated. For example, the dark cell resistance should be on the order of 100 times as high as the cell resistance in bright light. The charging and discharging time constants of capacitors 98, 100 can be chosen as by adjusting the bleeding resistor 108, so that rectifier 80 will fire only when the photocells 30, 32 are actuated at a predetermined rate. With this design, when the speed of the masking device such as the rotating disc 46 varies substantially from the speed at which the photocells are energized at the predetermined rate, capacitor 100 will not be charged sufficiently to maintain the rectifier 80 on and thus the device will operate to distinguish deviation from a predetermined speed rather than merely distinguishing between a stopped and a rotating condition. Moreover, it is to be understood that the invention has been disclosed herein for purposes of explanation and illustration and is not intended to indicate the limits of the present invention, the scope of which is defined by the following claims.

We claim:

1. In apparatus to sense velocity variations in the motion of an object, a source of electrical energy, first electrical energy storage means, first circuit means connected between said source and said storage means and including first switching means having a high impedance condition and a low impedance condition and operative when said first switching means is in one of said conditions to transfer electrical energy from said source to said storage means, output means having an input circuit, and second circuit means connected between said storage means and said input circuit and including second switching means having a high impedance condition and a low impedance condition and operative in one of said conditions to transfer energy from said storage means to said input circuit, and actuating means responsive to motion of said object to sequentially actuate said first switching means to said one impedance condition and then actuate said second switching means to said one impedance condition and then actuate said second switching means to said one impedance condition so that energy is progressively transferred from said source to said storage device and then from the storage device to the input circuit in response to motion of said object.

2. The apparatus set forth in claim 1 wherein said first and said second switching means are responsive to light variations to switch between the high and low impedance conditions and said actuating means includes light source means and light transfer means responsive to relative motion of said light source means and said object to transfer light from said light source means sequentially to said first switching means and then to said second switching means.

3. The apparatus set forth in claim 2 wherein said light source means is stationary relative to said object and said light transfer means includes light masking means mounted on said object for comovement therewith and having light pervious and impervious portions arranged in a pattern so that light from said source means irradiates said first switching means and then light from said source irradiates said second switching means in response to motion of said masking means.

4. The apparatus set forth in claim 3 wherein said light responsive means are spaced apart in the direction of the the motion of said masking means and said light pervious portions of said masking means are a arranged and disposed so that light from said source means doe not simultaneously irradiate said first said and said second switching means.

5. The apparatus set forth in claim 4 wherein said object is a rotatable shaft, said light masking means comprises an opaque disc having a light transmitting aperture therethrough and being mounted on said shaft for corotation therewith, said light source means being disposed at one face of said disc, and said switching means comprises a pair of photocells operatively disposed at an opposite face of said disc and aligned with said light source means and said aperture to receive light from said light source means passing through said aperture when said shaft rotates said disc.

6. The apertures set forth in claim 1 wherein said storage means is a capacitive reactance means.

7. The apparatus set forth in claim 6 wherein the source is a direct current source having a pair of output terminals, said capacitive reactance means is connected in series with said first switching means across said terminals, and said second circuit means is connected across said capacitive reactance means through said second switching means.

8. The apparatus forth in claim 7 wherein said second circuit means further comprises a second capacitive reactance means connected in series with said second switching means across said first capacitive reactance means and said output means further comprises an electron control device having a pair of input electrodes connected across said second capacitive reactance means.

9. The apparatus set forth in claim 8 wherein an impedance is connected in parallel with said second capacitive reactance means to discharge said capacitive reactance means at a predetermined rate.

10. The apparatus set forth in claim 1 wherein said source comprises an alternating current source, said first circuit means comprises rectifier means having a pair of output terminals and operative to develop a direct current output across said terminals, said first switching means comprises a photocell having a first terminal connected to one of said output terminals, said first storage device comprises a first capacitor having a first terminal connected to a second terminal of said photocell and a second terminal of said capacitor being connected to the other of said rectifier output terminals, said second switching means comprises a second photocell having a first terminal connected to said first terminal of said first capacitor, said second circuit means further comprises a second capacitor having a first terminal connected to a second terminal of the second photocell, said second capacitor further having a second terminal connected to said other output terminal of said rectifier, an impedance means connected in parallel with said second capacitor and a controlled rectifier having a control electrode biased by said impedance means.

PO-1050
(5/69)

UNITED STATES PATENT OFFICE
CERTIFICATE OF CORRECTION

Patent No. 3,560,752          Dated February 2, 1971

Inventor(s) Yee Lee and Robert W. Rauth

It is certified that error appears in the above-identified patent and that said Letters Patent are hereby corrected as shown below:

Column 1, line 34, before "prevent" add "to"; line 42, "section" should be --motion--; line 47, "alternatively" shou be --alternately--. Column 2, line 14, "receptive" should be --respective--; line 21, before "shaft" delete "sa"; line 23, before "which" delete "with". Column 3, line 26, after "Thus delete "the"; line 36, before "material" delete "he" and inse --the--; line 42, before "photocell" delete "said" and insert --and--; line 46, after "disconnect" insert --capacitor 100 f line 48, delete "alone" and insert --long--; line 53, after "photocells" delete "40" and insert --30--; line 65, after "photocell" delete "40" and insert --30--; line 70, after "capacitor" delete "200" and insert --100--. Column 4, line delete "operating" and insert --rotating--; line 64, delete "alternatively" and insert --alternately--. Column 5, line 2 after "condition" delete "and then actuate said"; line 30, be "so" delete "second switching means to said one impedance con tion"; line 51, after "direction of the" delete "the". Colum line 1, after "are" delete "a"; line 2, delete "doe" and inse --does--; line 3, after "first" delete "said"; line 14, delet "apertures" and insert -apparatus--; line 31, before "capacit insert --second--.

Signed and sealed this 10th day of August 1971.

(SEAL)
Attest:

EDWARD M. FLETCHER, JR.          WILLIAM E. SCHUYLER, JR.
Attesting Officer          Commissioner of Patents